(12) United States Patent
Senoo et al.

(10) Patent No.: US 10,512,382 B2
(45) Date of Patent: Dec. 24, 2019

(54) SELF-PROPELLED VACUUM CLEANER

(71) Applicant: SHARP KABUSHIKI KAISHA, Sakai, Osaka (JP)

(72) Inventors: Toshihiro Senoo, Sakai (JP); Yuhji Ohnishi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 164 days.

(21) Appl. No.: 15/552,298

(22) PCT Filed: Feb. 29, 2016

(86) PCT No.: PCT/JP2016/056070
§ 371 (c)(1),
(2) Date: Aug. 21, 2017

(87) PCT Pub. No.: WO2017/056524
PCT Pub. Date: Apr. 6, 2017

(65) Prior Publication Data
US 2018/0070788 A1    Mar. 15, 2018

(30) Foreign Application Priority Data
Sep. 30, 2015   (JP) ................................. 2015-193670

(51) Int. Cl.
*A47L 9/28* (2006.01)
*A47L 9/00* (2006.01)
*A47L 9/04* (2006.01)

(52) U.S. Cl.
CPC ............. *A47L 9/2889* (2013.01); *A47L 9/009* (2013.01); *A47L 9/0477* (2013.01);
(Continued)

(58) Field of Classification Search
CPC ...... A47L 9/2889; A47L 9/2805; A47L 9/009; A47L 9/0477; A47L 9/0488;
(Continued)

(56) References Cited

U.S. PATENT DOCUMENTS 7,056,185 B1 * 6/2006 Anagnostou ......... A63H 17/262
                                                        180/167
9,923,389 B2 * 3/2018 Kwon ................... A47L 9/2857
(Continued)

FOREIGN PATENT DOCUMENTS

JP    H07-334242 A    12/1995
JP    2015-075825 A    4/2015
(Continued)

*Primary Examiner* — Peter D Nolan
(74) *Attorney, Agent, or Firm* — ScienBiziP, P.C.

(57) ABSTRACT

To prevent a self-propelled vacuum cleaner from falling down an inclined surface, even if the remaining capacity of the battery becomes zero when the cleaner is located on the inclined surface.
The self-propelled vacuum cleaner comprises a housing provided with an electrically powered traveling mechanism for traveling on a floor surface, an electrically powered cleaning mechanism for cleaning while traveling on the floor surface, a battery, and a control unit for controlling and supplying electric power from the battery to the electrically powered traveling mechanism and the electrically powered cleaning mechanism, wherein the control unit controls travel of the housing stopping on an inclined surface inclined relative to a horizontal surface, so as to move the housing from a direction in which the housing attempts to travel on the inclined surface by the weight of the cleaner to a direction in which the housing does not fall down by the weight of the cleaner, and then to stop a supply of electric power to the electrically powered traveling mechanism.

5 Claims, 9 Drawing Sheets

(52) U.S. Cl.
CPC ........... *A47L 9/0488* (2013.01); *A47L 9/2805* (2013.01); *A47L 9/2826* (2013.01); *A47L 9/2842* (2013.01); *A47L 9/2847* (2013.01); *A47L 9/2852* (2013.01); *A47L 9/2857* (2013.01); *A47L 9/2884* (2013.01); *A47L 2201/022* (2013.01); *A47L 2201/04* (2013.01); *Y02B 40/82* (2013.01)

(58) Field of Classification Search
CPC .... A47L 9/2826; A47L 9/2842; A47L 9/2847; A47L 9/2852; A47L 9/2857; A47L 9/2884; A47L 2201/022; A47L 2201/04; Y02B 40/82
See application file for complete search history.

(56) References Cited

U.S. PATENT DOCUMENTS

| | | | | |
|---|---|---|---|---|
| 9,931,008 | B2* | 4/2018 | Yoo | A47L 9/009 |
| 10,022,029 | B2* | 7/2018 | Machida | A47L 9/10 |
| 10,143,348 | B2* | 12/2018 | MacHida | A47L 9/10 |
| 2013/0056032 | A1* | 3/2013 | Choe | A47L 9/0488 |
| | | | | 134/18 |
| 2013/0270459 | A1* | 10/2013 | Fontani | A61L 2/10 |
| | | | | 250/492.1 |
| 2015/0375395 | A1* | 12/2015 | Kwon | A47L 9/2857 |
| | | | | 700/245 |
| 2016/0095487 | A1* | 4/2016 | Koura | A47L 9/2884 |
| | | | | 15/383 |
| 2017/0150862 | A1* | 6/2017 | Machida | A47L 9/10 |
| 2017/0188767 | A1* | 7/2017 | Ichikawa | A47L 9/02 |
| 2017/0231446 | A1* | 8/2017 | Watanabe | A47L 9/00 |
| | | | | 15/319 |
| 2017/0231450 | A1* | 8/2017 | Ichikawa | A47L 9/28 |
| | | | | 15/319 |
| 2017/0231452 | A1* | 8/2017 | Saito | A47L 9/28 |
| | | | | 15/319 |
| 2017/0235309 | A1* | 8/2017 | Nakanishi | A47L 9/28 |
| | | | | 15/319 |
| 2017/0245717 | A1* | 8/2017 | Son | A47L 9/1683 |
| 2017/0273528 | A1* | 9/2017 | Watanabe | A47L 9/00 |
| 2017/0273532 | A1* | 9/2017 | Machida | A47L 9/10 |
| 2017/0351260 | A1* | 12/2017 | Willgert | G05D 1/027 |

FOREIGN PATENT DOCUMENTS

| | | |
|---|---|---|
| TW | 201406338 A | 2/2014 |
| WO | 2015/199198 A | 12/2015 |

* cited by examiner

SELF-PROPELLED VACUUM CLEANER

TECHNICAL FIELD

The present invention relates to a self-propelled vacuum cleaner.

BACKGROUND ART

As a background art of the present invention, there has been known a configuration in which, in a self-propelled vacuum cleaner operated by electric power supplied from a batter, when a remaining capacity in the battery becomes low, a notification regarding the remaining capacity in the battery being low is provided to a user before the supply of electric power from the batter is stopped (for example, see Patent Document 1).

CITATION LIST

Patent Document

Patent Document 1: Japanese Unexamined Patent Publication No. 2015-75825

SUMMARY OF THE INVENTION

Problem to be Solved by the Invention

However, the conventional self-propelled vacuum cleaner mentioned above has a problem such that, when there is no remaining capacity in the battery on an inclined surface, a drive wheel of the cleaner rotates by the weight of the cleaner because the drive wheel cannot electrically be locked, and therefore, the cleaner falls down the inclined surface to collide against furniture, scratch furniture, or give damage to the cleaner oneself.

The present invention is accomplished in view of the foregoing circumstance, and aims to provide a self-propelled vacuum cleaner that is prevented from falling down an inclined surface due to its own weight, even if the supply of electric power from a battery is stopped on the inclined surface due to a remaining capacity of the battery becoming low.

Solution to Problem

The present invention provides a self-propelled vacuum cleaner comprising a housing provided with an electrically powered traveling mechanism for traveling on a floor surface, an electrically powered cleaning mechanism for cleaning while traveling on the floor surface, a battery, and a control unit for controlling and supplying electric power from the battery to the electrically powered traveling mechanism and the electrically powered cleaning mechanism, wherein the control unit controls travel of the housing stopping on an inclined surface inclined relative to a horizontal surface, so as to move the housing from a direction in which the housing attempts to travel on the inclined surface by the weight of the cleaner to a direction in which the housing does not fall down by the weight of the cleaner, and then to stop a supply of electric power to the electrically powered traveling mechanism.

Effect of the Invention

According to the present invention, when the remaining capacity in the battery becomes low on an inclined surface, the control unit stops the supply of electric power to the electrically powered traveling mechanism after changing the direction in which the housing attempts to travel on the inclined surface by the weight of the cleaner to the direction in which the housing does not fall down by the weight of the cleaner. Accordingly, the housing is prevented from falling down the inclined surface, and thus, it is prevented that the cleaner falls down the inclined surface to collide against furniture, scratch furniture, or give damage to the cleaner oneself.

EMBODIMENTS OF THE INVENTION

The self-propelled vacuum cleaner according to the present invention comprises a housing provided with an electrically powered traveling mechanism for traveling on a floor surface, an electrically powered cleaning mechanism for cleaning while traveling on the floor surface, a battery, and a control unit for controlling and supplying electric power from the battery to the electrically powered traveling mechanism and the electrically powered cleaning mechanism, wherein the control unit controls travel of the housing stopping on an inclined surface inclined relative to a horizontal surface, so as to move the housing from a direction in which the housing attempts to travel on the inclined surface by the weight of the cleaner to a direction in which the housing does not fall down by the weight of the cleaner, and then to stop a supply of electric power to the electrically powered traveling mechanism.

For example, the electrically powered traveling mechanism is provided with a pair of first and second drive wheels and at least one driven wheel for causing the housing to travel while supporting the housing, and first and second motors for driving the first and second drive wheels respectively, wherein axles of the first and second drive wheels are aligned on a same axis, and the direction in which the housing attempts to travel on the inclined surface by the weight of the cleaner is set to a direction perpendicular to the axels.

It is preferable that, when travel of the housing is stopped on the inclined surface, the control unit temporarily locks the first drive wheel by locking the first motor that drives the first drive wheel, stops the supply of electric power from the battery to the second motor that drives the second drive wheel to set the second drive wheel free, and then, stops the supply of electric power from the battery to the first motor to set the first drive wheel free.

The first and second motors may include rotary encoders for detecting whether or not the first and second drive wheels rotate, and the control unit may be configured to, when travel of the housing is stopped on the inclined surface, repeat an operation for turning the housing at a small angle and an operation for stopping the supply of electric power to the first and second motors from the battery, until the drive wheels stop rotating when the supply of electric power to the first and second motors from the battery is stopped.

The housing may be provided with a three-axis acceleration sensor for detecting an orientation of the housing, and the control unit may be configured to, when travel of the housing is stopped on the inclined surface, turn the housing so that the direction of the axels of the first and second drive wheels and an inclination direction of the inclined surface coincide with each other, and then, to stop the supply of electric power to the first and second motors from the battery.

Hereinafter, the present invention will be described in detail with reference to first to third embodiments shown in the drawings. The present invention is not limited by these embodiments.

First Embodiment (1) Configuration of Self-Propelled Vacuum Cleaner

Figure 1:
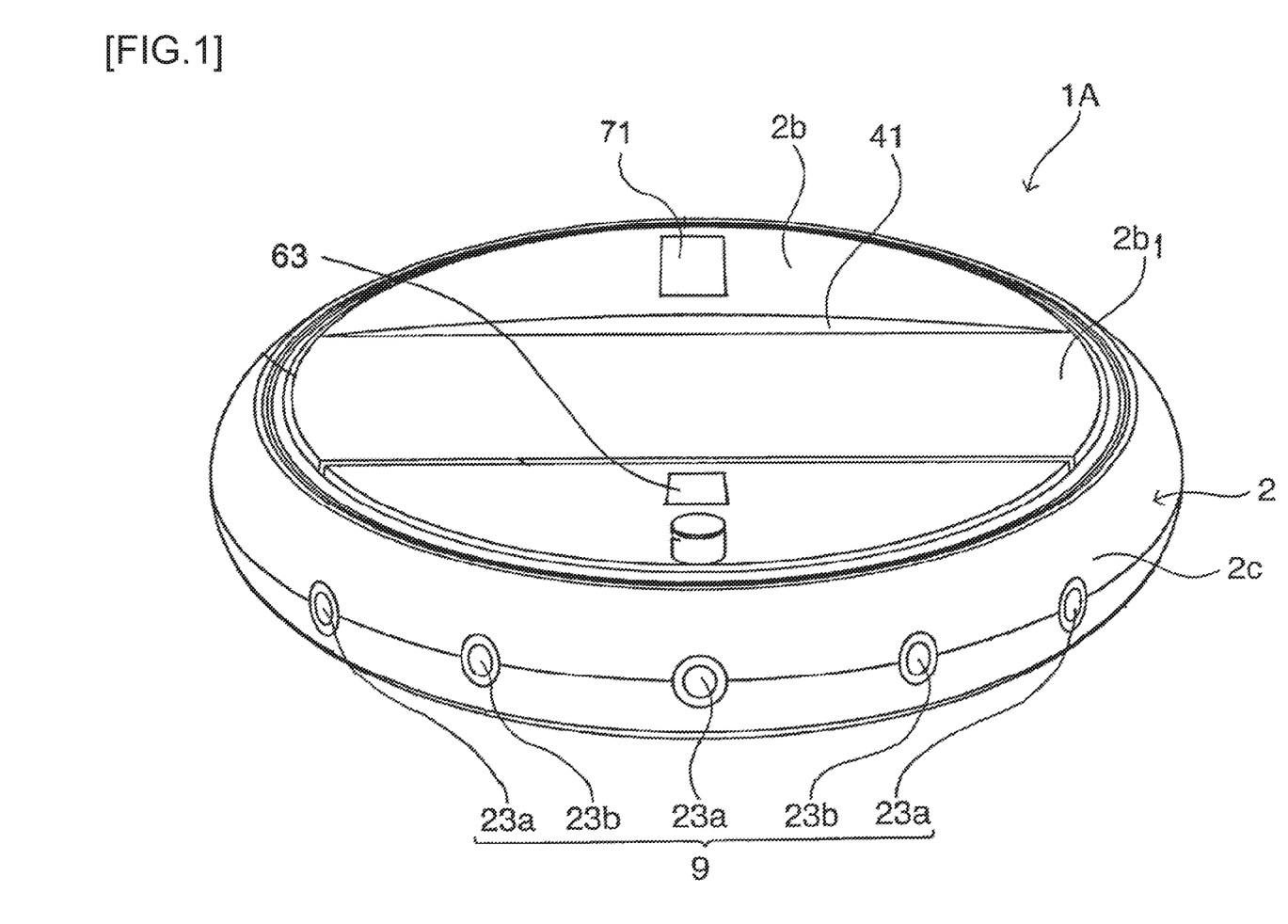
FIG. 1 is a perspective view of a self-propelled vacuum cleaner according to a first embodiment of the present invention as viewed from a top surface.
Figure 2:
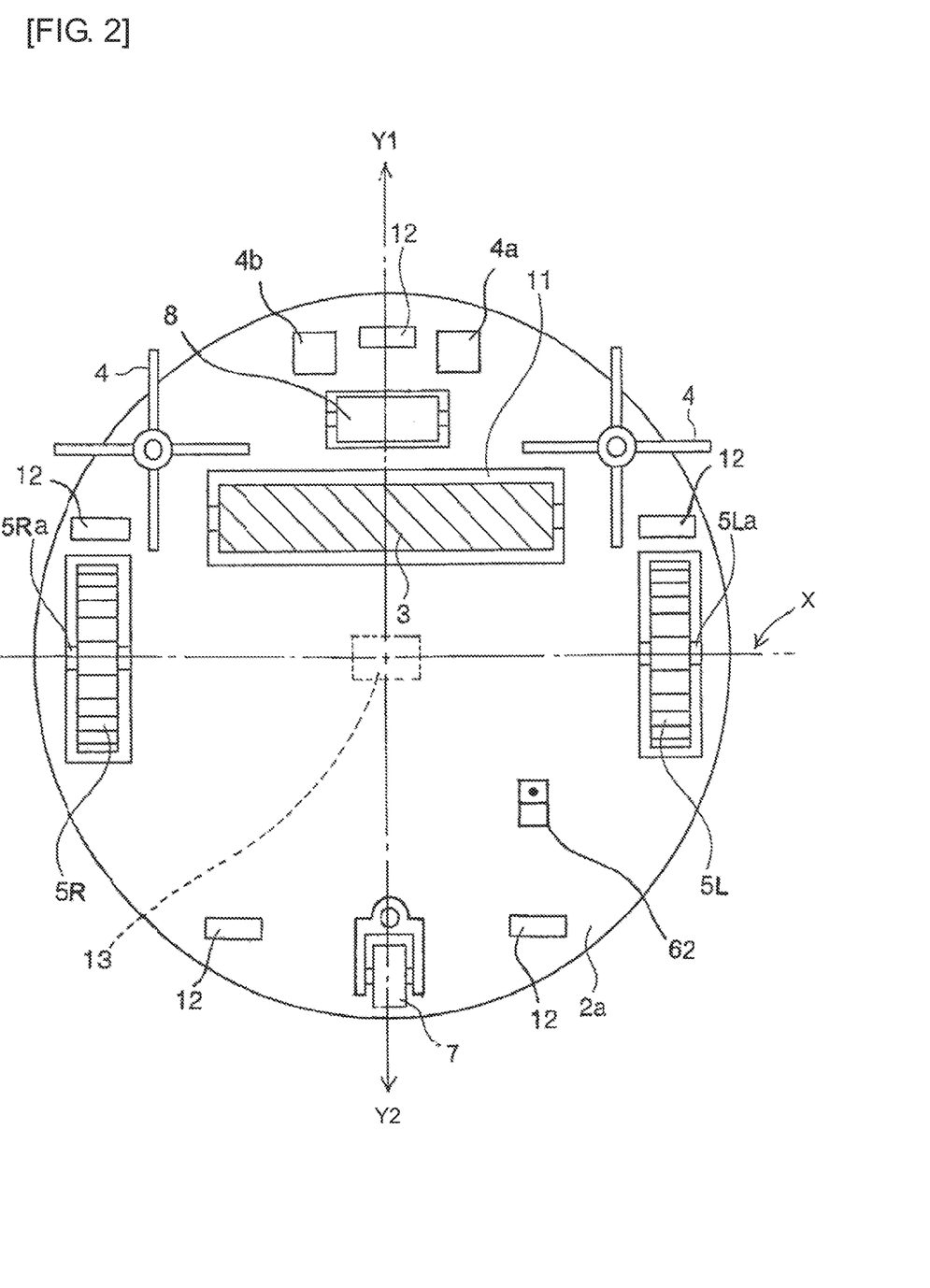
FIG. 2 is a bottom view of the self-propelled vacuum cleaner shown in FIG. 1.
Figure 3:
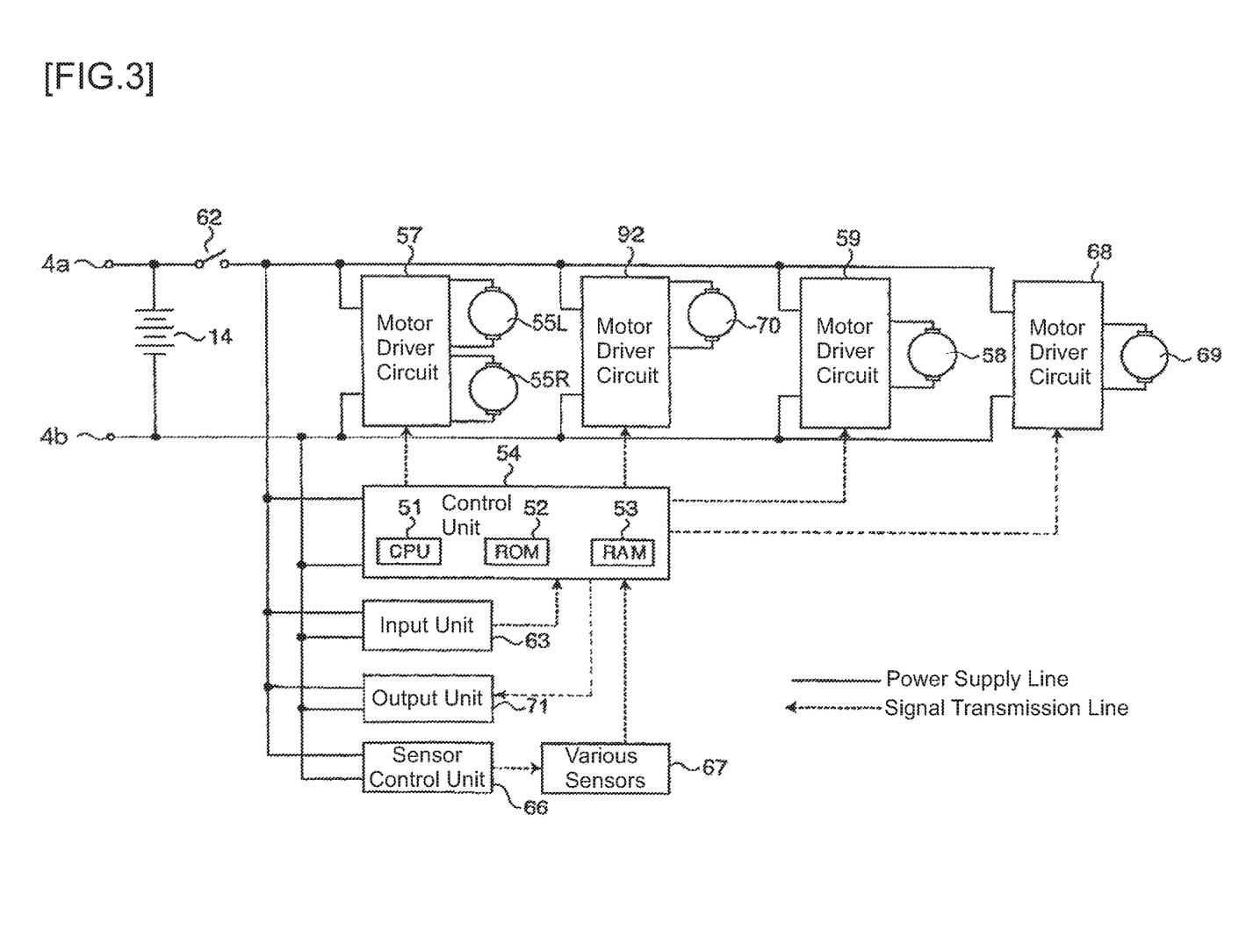
FIG. 3 is a block diagram of a control circuit of the self-propelled vacuum cleaner shown in FIG. 1.
Figure 4:
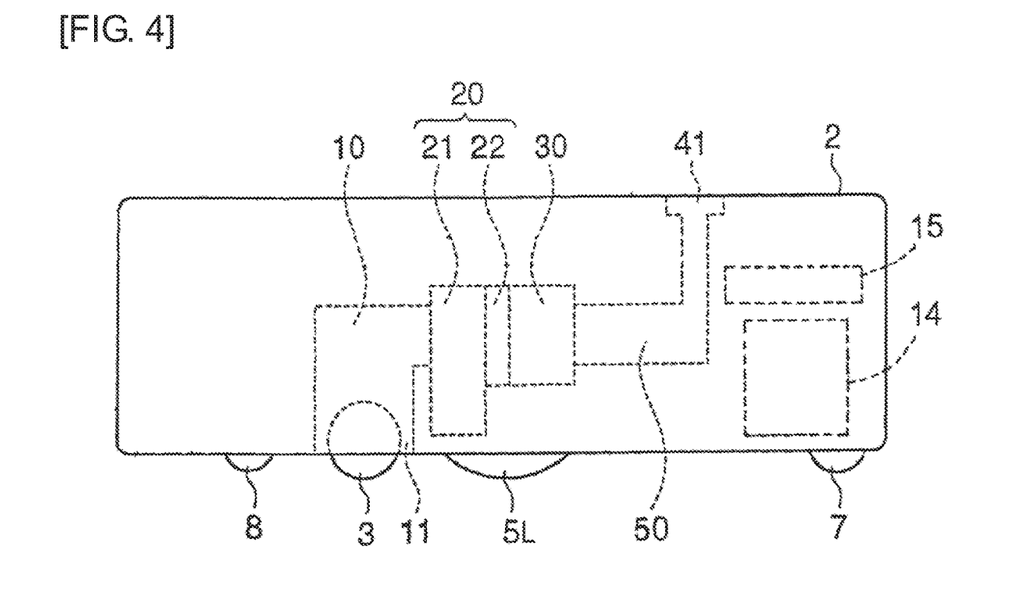
FIG. 4 is an explanatory view showing an internal configuration of the self-propelled vacuum cleaner shown in FIG. 1 as viewed from a side surface.

FIG. 1 is a perspective view of a self-propelled vacuum cleaner according to the first embodiment of the present invention as viewed from top, FIG. 2 is a bottom view of the self-propelled vacuum cleaner shown in FIG. 1, and FIG. 3 is a block diagram of a control circuit of the self-propelled vacuum cleaner shown in FIG. 1. In addition, FIG. 4 is an explanatory view of an internal configuration of the self-propelled vacuum cleaner shown in FIG. 1 as viewed from a side surface.

The self-propelled vacuum cleaner (hereinafter referred to as a cleaner robot) performs cleaning while traveling, that is, suctions dust on a floor surface together with air and exhausts air from which dust is removed, while being self-propelled on the floor surface, thereby cleaning the floor surface.

As shown in FIG. 1, a cleaner robot 1A has a disc-shaped housing 2 provided with an exhaust opening 41 on the top surface thereof. As shown in FIG. 2, the cleaner robot 1A is provided with, on a bottom plate 2a, a rotary brush 3, a pair of side brushes 4, a suction opening 11, a right drive wheel 5R and a left drive wheel 5L, a rear wheel 7 and a front wheel 8, five floor surface detection sensors 12 mounted on the peripheral edge of the bottom plate 2a, charging power-receiving terminals 4a and 4b, and a power supply switch (toggle switch) 62.

Note that the housing 2 is formed from an electrically insulating material (for example, an ABS resin). In addition, the housing 2 has a built-in three-axis acceleration sensor 13 for detecting the orientation and the direction of movement of the cleaner robot 1A. Each of the floor surface detection sensors 12 includes a light-emitting element that radiates infrared ray to the floor surface and a light-receiving element that receives reflection light from the floor surface, and detects the floor surface or presence or absence of a bump on the floor surface.

As shown in FIG. 4, the housing 2 also has inside a suction path 10 connected to the suction opening 11, a dust-collecting section 20 provided downstream of the suction path 10, an electrically powered fan 30 provided downstream of the dust-collecting section 20, and an exhaust path 50 connecting the electrically powered fan 30 and the exhaust opening 41 to each other. Further, a control board 15 having mounted thereto a control circuit (described later) of the cleaner robot 1A and a battery (storage battery) 14 are built into the housing 2 on the rear part of the housing 2. The dust-collecting section 20 includes a dust-collecting box 21 and a filter 22.

As shown in FIG. 1, the housing 2 has a top plate 2b which is circular in a plan view and is provided with a lid 2b₁ and the exhaust opening 41 formed at the rear of the lid 2b₁, and a side plate 2c which is formed along outer peripheries of the bottom plate 2a and the top plate 2b and has an annular shape in a plan view. The top plate 2b is provided with an input unit 63 by which a user inputs a command to start and stop the cleaner robot 1A and an output unit 71 for providing (outputting) notifications regarding various information items to the user.

The bottom plate 2a (FIG. 2) is formed with a plurality of holes from which lower parts of the front wheel 8 and the left and right drive wheels 5L and 5R project to the outside from the housing 2. In addition, a plurality of ultrasonic sensors 9 detecting an obstacle present in the traveling direction of the cleaner robot 1A is provided on the front part of the side plate 2c as shown in FIG. 1.

In this embodiment, the ultrasonic sensors 9 include three ultrasonic receivers 23a and two ultrasonic transmitters 23b in an alternate manner. An ultrasonic wave transmitted from the ultrasonic transmitters 23b to an obstacle is reflected on the ultrasonic receivers 23a, whereby the obstacle is detected.

The left and right drive wheels 5L and 5R (FIG. 2) are respectively mounted to be parallel to the bottom plate 2a of the housing 2, and rotatable around rotary shafts 5La and 5Ra which are arranged coaxially with an axis X shown in FIG. 2. When the left and right drive wheels 5L and 5R rotate in the same direction, the housing 2 moves forward or backward in directions indicated by arrows Y1 and Y2, and when the left and right drive wheels 5L and 5R rotate in directions opposite to each other, the housing 2 turns.

The rotary shafts 5La and 5Ra of the left and right drive wheels 5L and 5R are connected to a pair of drive wheel motors (described later) through a reduction gear so as to independently receive rotation force from each of the pair of drive wheel motors. Each of the drive wheel motors is fixed on the inner surface of the bottom plate 2a of the housing 2 directly or through a suspension mechanism.

The front wheel 8 is composed of a driven roller, and is mounted to the bottom plate 2a of the housing 2 in a freely rotatable manner on a position where the front wheel 8 is raised a little from the floor surface with which the drive wheels 5 are in contact, in such a way that, when the front wheel 8 is brought into contact with a bump appearing in the travel course, the housing 2 easily goes over the bump.

The rear wheel 7 is a swivel wheel, and is mounted on a rear part of the bottom plate 2a of the housing 2 in a freely rotatable manner so as to be in contact with the floor surface.

As described above, the left and right drive wheels 5L and 5R are arranged at the middle of the housing 2 in the front-rear direction, the front wheel 8 is raised from the floor surface, and the weight is distributed in the front-rear direction of the housing 2 in order that the full weight of the cleaner robot 1A can be supported by the left and right drive wheels 5L and 5R and the rear wheel 7. With this configuration, dust present ahead in the travel course can be guided to the suction opening 11 without being interfered with the front wheel 8.

The rotary brush 3 described above is provided to an inlet of the suction opening 11 so as to be rotatable around a shaft parallel to the bottom plate 2a of the housing 2. Further, the side brushes 4 on the bottom plate 2a on left and right sides of the suction opening 11 are rotated around a rotary shaft perpendicular to the bottom plate 2a.

The rotary brush 3 is formed by implanting brushes in a spiral manner on the outer peripheral surface of a roller serving as the rotation shaft, and is driven by a rotary brush drive motor described later.

Each of the side brushes 4 is formed by radially providing four brush bundles on the lower end of the rotary shaft. The rotary shafts of the side brushes 4 are supported on the inner surface of the housing 2 so as to be perpendicular to the bottom plate 2a and driven by a later-described side brush drive motor.

(2) Configuration of Control System of Self-Propelled Vacuum Cleaner

The control circuit mounted on the control board 15 (FIG. 4) for controlling the cleaner robot 1A includes, as shown in FIG. 3, a control unit 54 provided with a microcomputer including a CPU 51, a ROM 52, and a RAM 53, a motor driver circuit 57 for individually controlling drive wheel motors 55L and 55R that respectively drive the left and right drive wheels 5L and 5R, a motor driver circuit 59 for controlling a rotary brush drive motor 58 that drives the rotary brush 3, a motor driver circuit 92 for controlling a side brush drive motor 70 that simultaneously drives two side brushes 4, a motor driver circuit 68 for controlling a fan motor 69 built in the electrically powered fan 30, a power supply switch 62 for inputting power from the battery 14 to the control circuit, a sensor control unit 66 for performing a drive control of various sensors 67, the input unit 63, and the output unit 71.

Various sensors 67 include: a later-described rotary encoder; the floor surface detection sensor 12, the ultrasonic sensors 9, and the three-axis acceleration sensor 13 which are described above; and the like. A DC motor is used for the motors 55L, 55R, 58, 69, and 70. In the present embodiment, a DC brushless motor (having a built-in rotary encoder) is used for the drive wheel motors 55L and 55R, and the motor driver circuit 57 performs an operation for rotating the drive wheel motors 55L and 55R in the same direction or in opposite directions, a speed control thereof, and an operation for locking (restraining) the drive wheel motors 55L and 55R when they are stopped.

In the configuration described above, when the power supply switch 62 is turned on, output power from the battery 14 is supplied to the motor driver circuits 57, 92, 59, and 68, respectively, and also supplied to the control unit 54, the input unit 63, the output unit 71, the sensor control unit 66, and the like, respectively.

The CPU 51 in the control unit 54 is a central processing unit, and is configured to compute signals received from the input unit 63 and various sensors 67 on the basis of a program stored in the ROM 52 in advance and output the resultant signals to the motor driver circuits 57, 92, 59, and 68, and the like.

The built-in rotary encoder of each of the left and right drive wheel motors 55L and 55R detects the rotation of the corresponding motor. The control unit 54 always detects (monitors) the travel speed, travel distance, location, orientation, and the like of the cleaner robot 1A on the basis of the outputs from the rotary encoders and the output from the three-axis acceleration sensor 13 (FIG. 2), and stores the detected results in the RAM 53. Specifically, the rotary encoders in the motors 55L and 55R and the three-axis acceleration sensor 13 constitute a monitoring sensor that monitors the location, direction of movement, distance of movement, inclination, and the like of the cleaner robot 1A.

As shown in FIG. 1, the input unit 63 is mounted on the top plate 2b, and includes a touch switch for allowing a user to input a "start command" or a "stop command" to the control unit 54 (FIG. 3).

Note that the RAM 53 is configured to store various operating conditions of the cleaner robot 1A and the outputs from various sensors 67.

In addition, the RAM 53 can store a travel map of the cleaner robot 1A. The travel map is information pertaining to travel of the cleaner robot 1A such as a travel course or a travel speed. The travel map can be stored in advance in the RAM 53 by the user or can be automatically recorded in the cleaner robot 1A by oneself during a cleaning operation.

Figure 5:
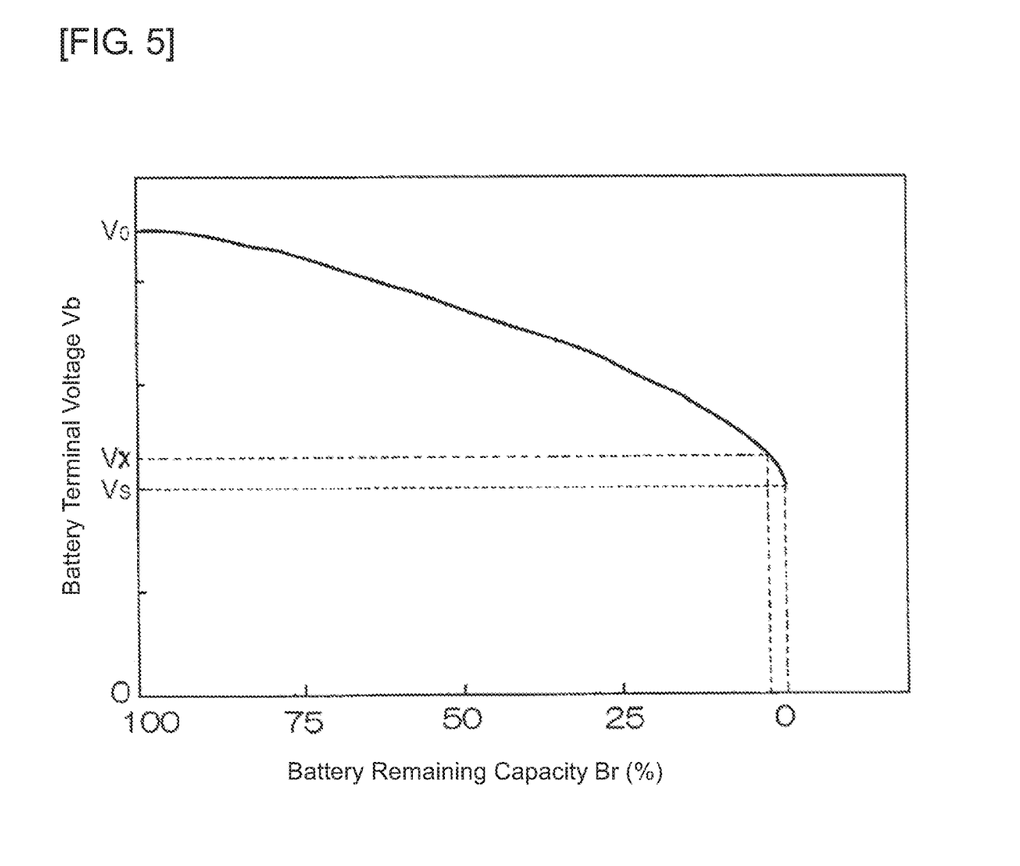
FIG. 5 is a characteristic diagram showing characteristics between a battery remaining capacity Br and a battery terminal voltage Vb of a battery mounted to the self-propelled vacuum cleaner shown in FIG. 1.

FIG. 5 shows a change in a battery terminal voltage Vb relative to a battery remaining capacity Br (%) when the battery (storage battery) 14 is discharged at a constant current. It is understood from FIG. 5 that the terminal voltage Vb gradually drops with the decrease in the battery remaining capacity Br, and can eventually drop to a discharge end voltage Vs (rechargeable voltage).

In the present embodiment, the battery remaining capacity Br when the terminal voltage Vb drops to the Vs (discharge end voltage) is set to be 0%. Note that a lithium ion battery, a nickel hydrogen battery, or an Ni—Cd battery is used for the battery 14.

(3) Operation of Self-Propelled Vacuum Cleaner

In the cleaner robot 1A thus configured, when the user inputs the "start command" by means of the input unit 63, the electrically powered fan 30, the drive wheels 5L and 5R, the rotary brush 3, and the side brushes 4 are driven.

Thus, with the rotary brush 3, the side brushes 4, the drive wheels 5L and 5R, and the rear wheel 7 being in contact with the floor surface, the housing 2 suctions air including dust on the floor surface from the suction opening 11 while being self-propelled within a predetermined range. During this operation, dust on the floor surface is stirred up and guided to the suction opening 11 due to the rotation of the rotary brush 3. In addition, dust present at the side of the suction opening 11 is guided to the suction opening 11 due to the rotation of the side brushes 4.

As shown in FIG. 4, air containing dust suctioned into the housing 2 through the suction opening 11 passes through the suction path 10 in the housing 2, and flows into the dust-collecting box 21. The airflow flowing into the dust-collecting box 21 passes through the filter 22 and is discharged to the exhaust opening 41 through the exhaust path 50. At that time, the dust contained in the airflow in the dust-collecting box 21 is captured by the filter 22, so that dust is accumulated in the dust-collecting box 21. In this way, cleaning on the floor surface is performed.

It is to be noted that, as described above, the cleaner robot 1A can move forward by the forward rotations of the left and right drive wheels 5L and 5R in the same direction, move backward by the reverse rotations of the left and right drive wheels 5L and 5R in the same direction, and turn when the left and right drive wheels 5L and 5R rotate in opposite directions.

For example, when the cleaner robot 1A almost reaches a large bump (cliff) or reaches the end of the cleaning region, or when the cleaner robot 1A approaches an obstacle present on the travel course, the floor detection sensor 12 (FIG. 2) or other various sensors provide notification regarding this situation to the control unit 54 (FIG. 3), and the drive wheels 5 are stopped. Then, the left and right drive wheels 5 rotate in opposite directions to change the direction.

Thus, the cleaner robot 1A can be self-propelled, while avoiding a large bump or an obstacle, to perform a cleaning operation throughout an entire place where it is installed or an entire desired range.

The cleaner robot 1A can perform a cleaning operation according to a desired travel pattern on the basis of a program stored in advance in the ROM 52 or the travel course stored in advance in the RAM 53.

After finishing a predetermined cleaning operation according to the desired travel pattern, the cleaner robot 1A returns to a home position (charging stand), and the battery 14 can be charged by the charging stand (not shown) through the power-receiving terminals 4a and 4b.

Now, a flow of a specific operation of the cleaner robot 1A according to the first embodiment will be described with reference to the flowchart in FIG. 6.

Figure 6:
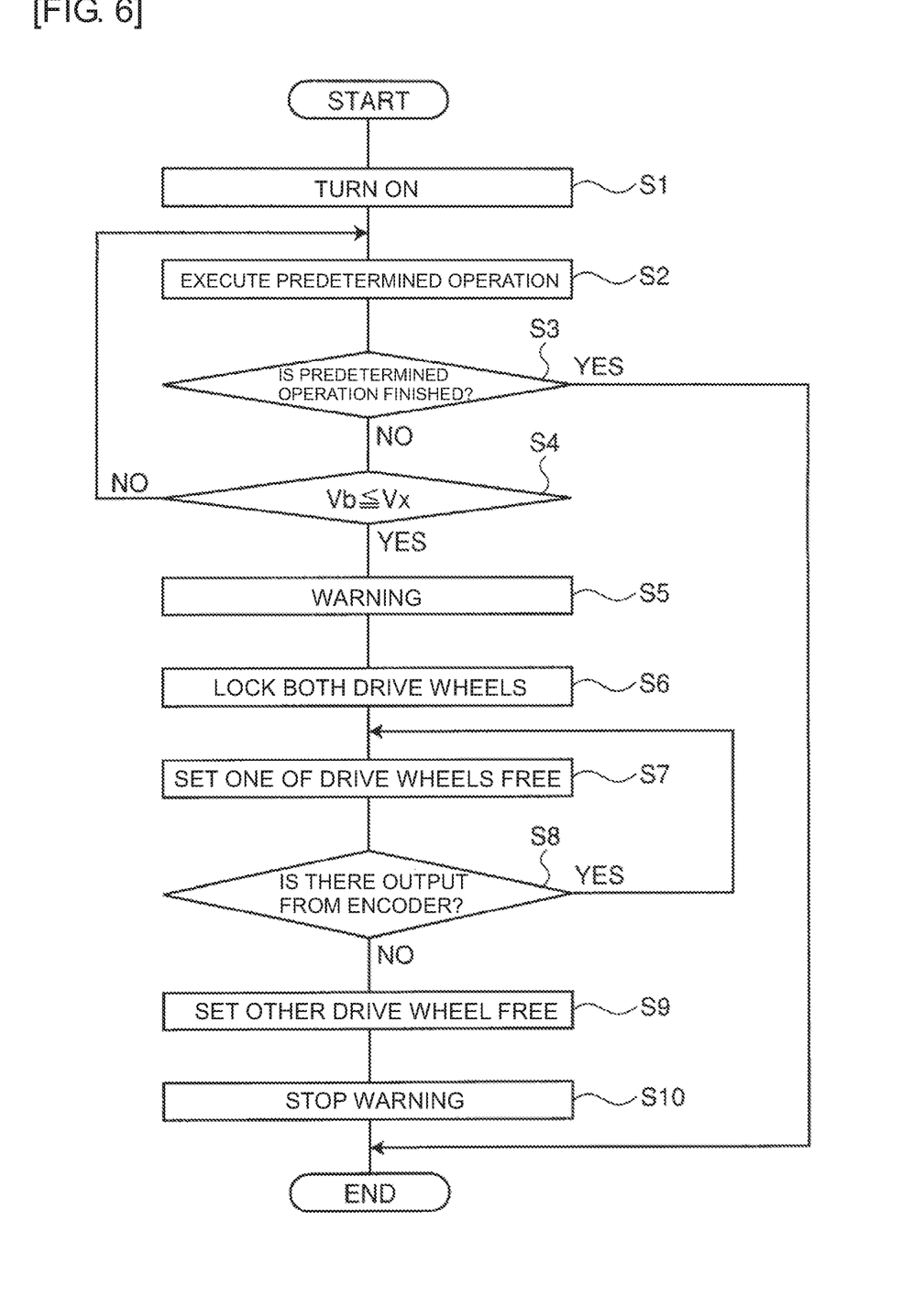
FIG. 6 is a flowchart showing the operation in the first embodiment of the present invention.

As shown in FIG. 6, when the power supply switch 62 is turned on and the start command is inputted from the input unit 63 (step S1), the cleaner robot 1A executes a predetermined cleaning operation (step S2).

Then, it is determined whether or not the predetermined cleaning operation is finished (step S3). When it is detected that, in a state where the operation has not been finished, the terminal voltage Vb of the battery 14 drops to Vx and the battery remaining capacity Br drops to 5%, for example, as shown in FIG. 5 (step S4), a warning in the form of character information or sound information for encouraging the user to charge the battery 14 is outputted from the output unit 71 (step S5).

Next, both the drive wheel motors 55L and 55R are electrically locked, by which the left and right drive wheels 5L and 5R are locked (step S6).

Then, the supply of electric power from the motor driver circuit 57 to one of the drive wheel motors, in this case, the left drive wheel motor 55L, is stopped, so that the left drive wheel 5L is freed from the drive control (step S7).

Figure 7:
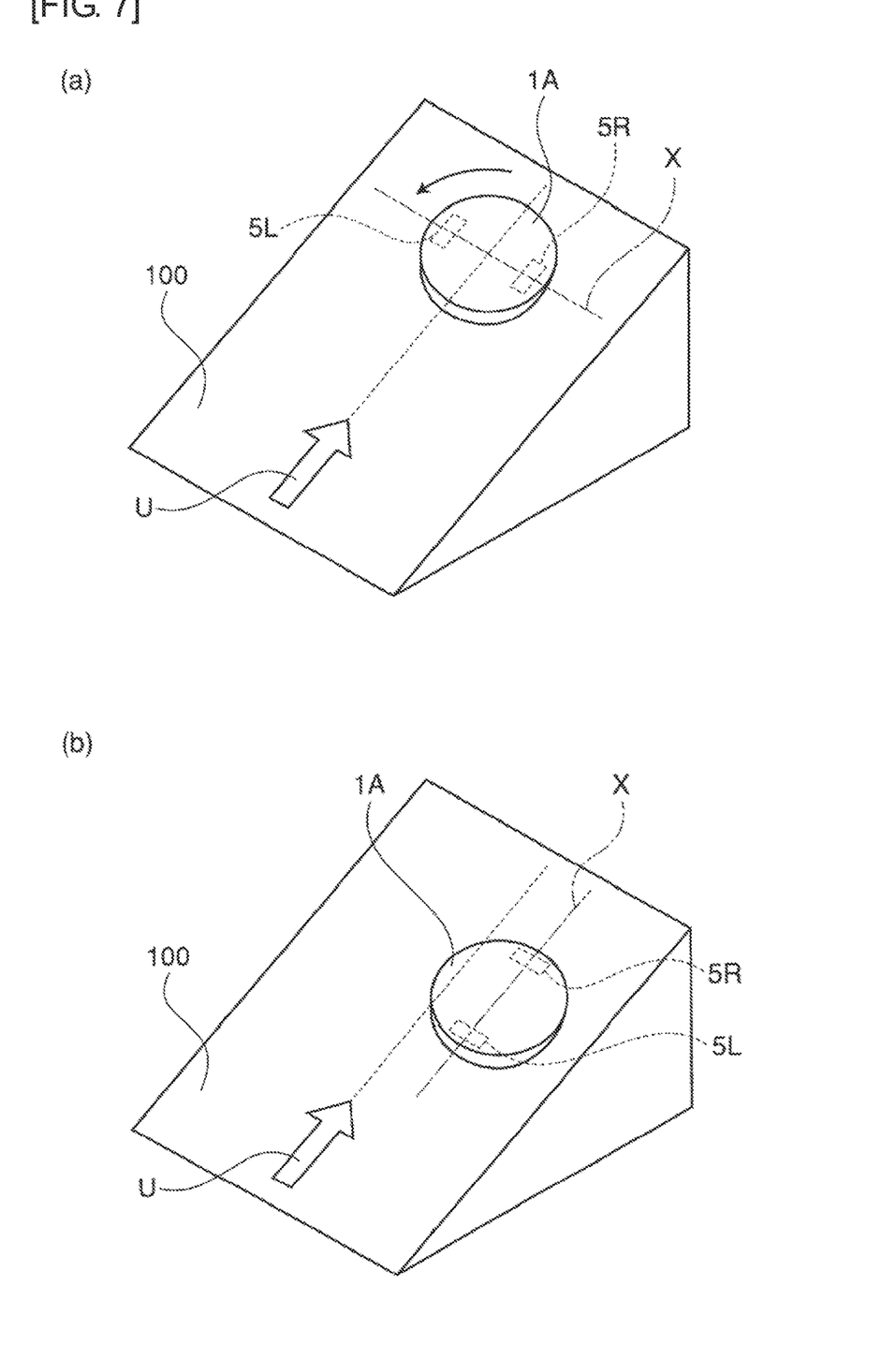
FIG. 7 is an explanatory view showing an installment condition of the self-propelled vacuum cleaner according to the present invention.

In this case, when the cleaner robot 1A is located on an inclined surface 100 as shown in FIG. 7(a), the cleaner robot 1A turns in a counterclockwise direction around the locked right drive wheel 5R due to the rotation of the free left drive wheel 5L by the gravity action, and the rotation of the left drive wheel 5L is detected by the rotary encoder in the drive wheel motor 55L (step S8).

When the cleaner robot 1A is in the state shown in FIG. 7(b), that is, when the direction of the axis X passing through the rotary shafts 5Ra and 5La substantially coincides with (becomes substantially parallel to) the direction of the inclination indicated by an arrow U, the left drive wheel 5L spontaneously stops. This situation is detected by the output from the rotary encoder in the left drive wheel motor 55L. Then, the supply of electric power to the right drive wheel motor 55R from the motor driver circuit 57 is also stopped, by which the right drive wheel 5R is also freed from the drive control (step S9).

Thus, when the cleaner robot 1A stops on the inclined surface 100 with no capacity in the battery, the cleaner robot 1A does not fall down the inclined surface 100. After the cleaner robot 1A stops, the warning outputted from the output unit 71 is stopped (step S10).

Notably, when the predetermined operation is finished in step S3, the cleaner robot 1A returns to the home position (charging stand). In addition, when the cleaner robot 1A is not present on the inclined surface 100 shown in FIG. 7(a), the routine directly proceeds to step S9 from step S8.

FIG. 7(b) shows the case where the angle made by the axis X passing through the rotary shafts 5L and 5R and the inclination direction indicated by the arrow U is almost 0 degree (they are parallel to each other). However, the angle is not limited to 0 degree. An angle by which the cleaner robot 1A does not fall down the inclined surface 100 by the weight of the cleaner robot 1A even if the left drive wheel 5L or right drive wheel 5R becomes free may be applied. Naturally, the angle made by the axis X passing through the rotary shafts 5L and 5R and the inclination direction indicated by the arrow U differs depending on the inclination angle of the inclined surface 100.

Figure 8:
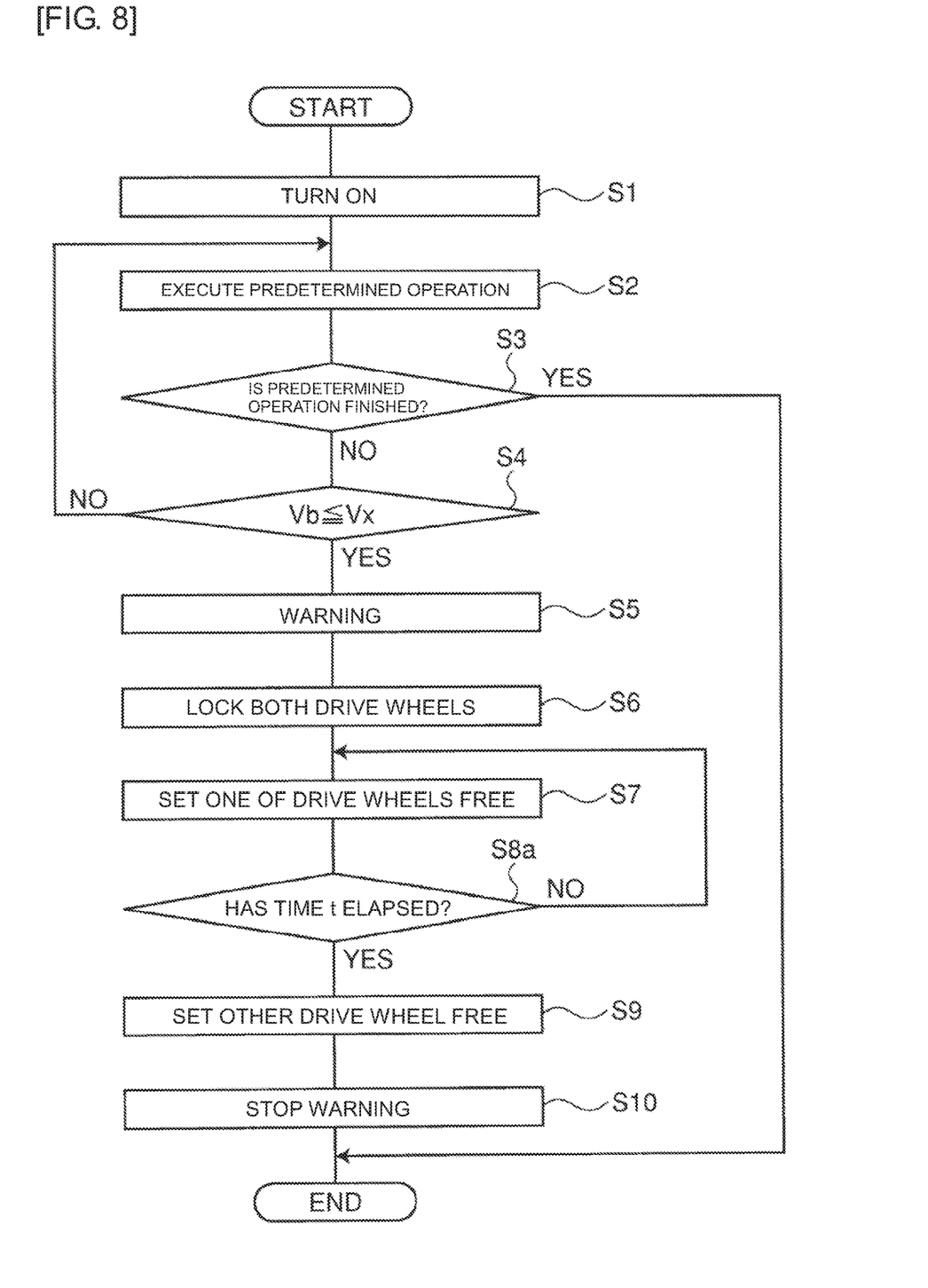
FIG. 8 is a flowchart, corresponding to FIG. 6, showing a modification of the first embodiment of the present invention.

FIG. 8 which corresponds to FIG. 6 illustrates a modification of the present embodiment. In this modification, only step S8 shown in FIG. 6 is replaced by step S8a. Specifically, in place of the process in step S8 in FIG. 6 in which "the stop of the rotation of the drive wheel 5L is confirmed by the output from the rotary encoder", a process of "waiting for a time t (for example, 5 seconds) during which the left drive wheel 5L is supposed to stop" is performed. According to this modification, the effect equivalent to the effect obtained by the embodiment in FIG. 6 can be obtained.

Second Embodiment

Figure 9:
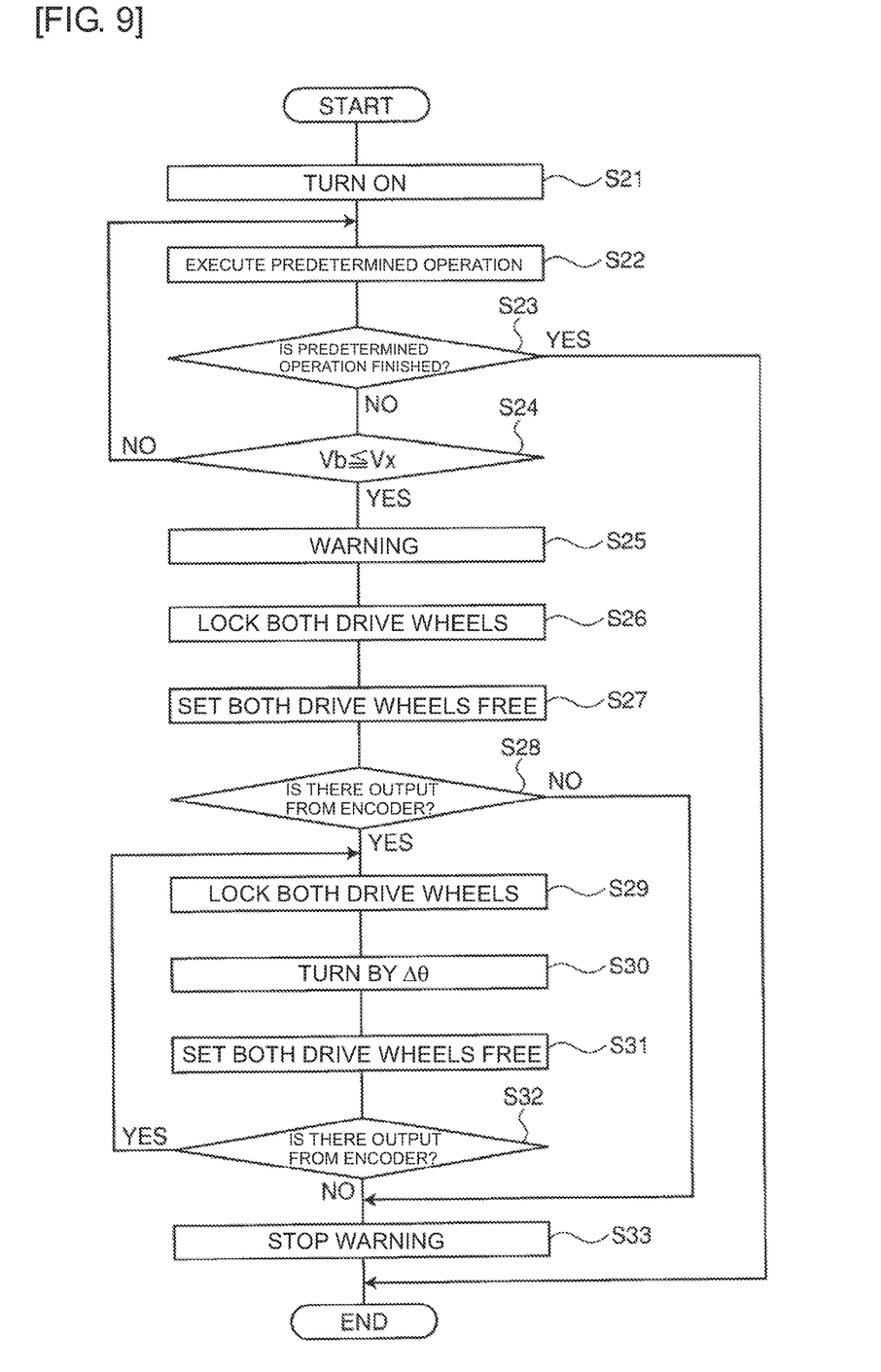
FIG. 9 is a flowchart showing an operation in a second embodiment of the present invention.

FIG. 9 is a diagram, corresponding to FIG. 6, showing an operation in the second embodiment of the present invention. The other configurations are the same as those in the first embodiment, and the description thereof will be omitted.

Hereinafter, a flow of a specific operation of a cleaner robot 1A according to the second embodiment will be described with reference to the flowchart in FIG. 9.

As shown in FIG. 9, when the power supply switch 62 is turned on and the start command is inputted from the input unit 63 (step S21), the cleaner robot 1A executes a predetermined cleaning operation (step S22). Then, it is determined whether or not the predetermined cleaning operation is finished (step S23).

When it is detected that, in a state where the operation has not been finished, the terminal voltage Vb of the battery 14 drops to Vx and the battery remaining capacity Br drops to 5%, for example, as shown in FIG. 5 (step S24), a warning in the form of character information or sound information for encouraging the user to charge the battery 14 is outputted from the output unit 71 (step S25).

Then, the drive wheel motors 55L and 55R are both temporarily locked, whereby the drive wheels 5L and 5R are both locked (step S26). Next, the supply of electric power to the drive wheel motors 55L and 55R is interrupted, so that the left and right drive wheels 5L and 5R are freed from the drive control of the motor driver circuit 57 (step S27).

Thereafter, when the rotations of the left and right drive wheels 5L and 5R are detected according to the outputs from the rotary encoders, it is determined that the cleaner robot 1A starts to fall down the inclined surface (descending operation is started) (step S28), and the drive wheels 5L and 5R are both locked (step S29). Then, the cleaner robot 1A turns only at a predetermined small angle Δθ (for example, 10 degrees) (step S30).

The left and right drive wheels 5L and 5R again become free (step S31), and the rotations of both wheels (descending operation) are checked (step S32). When the direction of the axis X passing through the rotary shafts 5Ra and 5La approaches the direction of the inclination indicated by the arrow U as shown in FIG. 7(b) due to the processes in steps S29 to S32 being repeated, the left and right drive wheels 5L and 5R which are free spontaneously stop rotating.

The stop of the left and right drive wheels 5L and 5R is detected by the outputs from the rotary encoders of the respective drive wheel motors 55L and 55R (step S32), and therefore, the left and right drive wheels 5L and 5R are kept in their free states.

In this way, when the cleaner robot 1A stops on the inclined surface 100 with no capacity in the battery, the cleaner robot 1A does not fall down the inclined surface 100. After the cleaner robot 1A stops, the warning outputted from the output unit 71 is stopped (step S33).

Notably, when the predetermined operation is finished in step S23, the cleaner robot 1A returns to the home position (charging stand). In addition, when the left and right drive wheels 5L and 5R do not rotate in step S28, it is determined that the cleaner robot 1A is not present on the inclined surface, and therefore, the routine proceeds to step S33 with the left and right drive wheels 5L and 5R being freed from the drive control.

Third Embodiment

Figure 10:
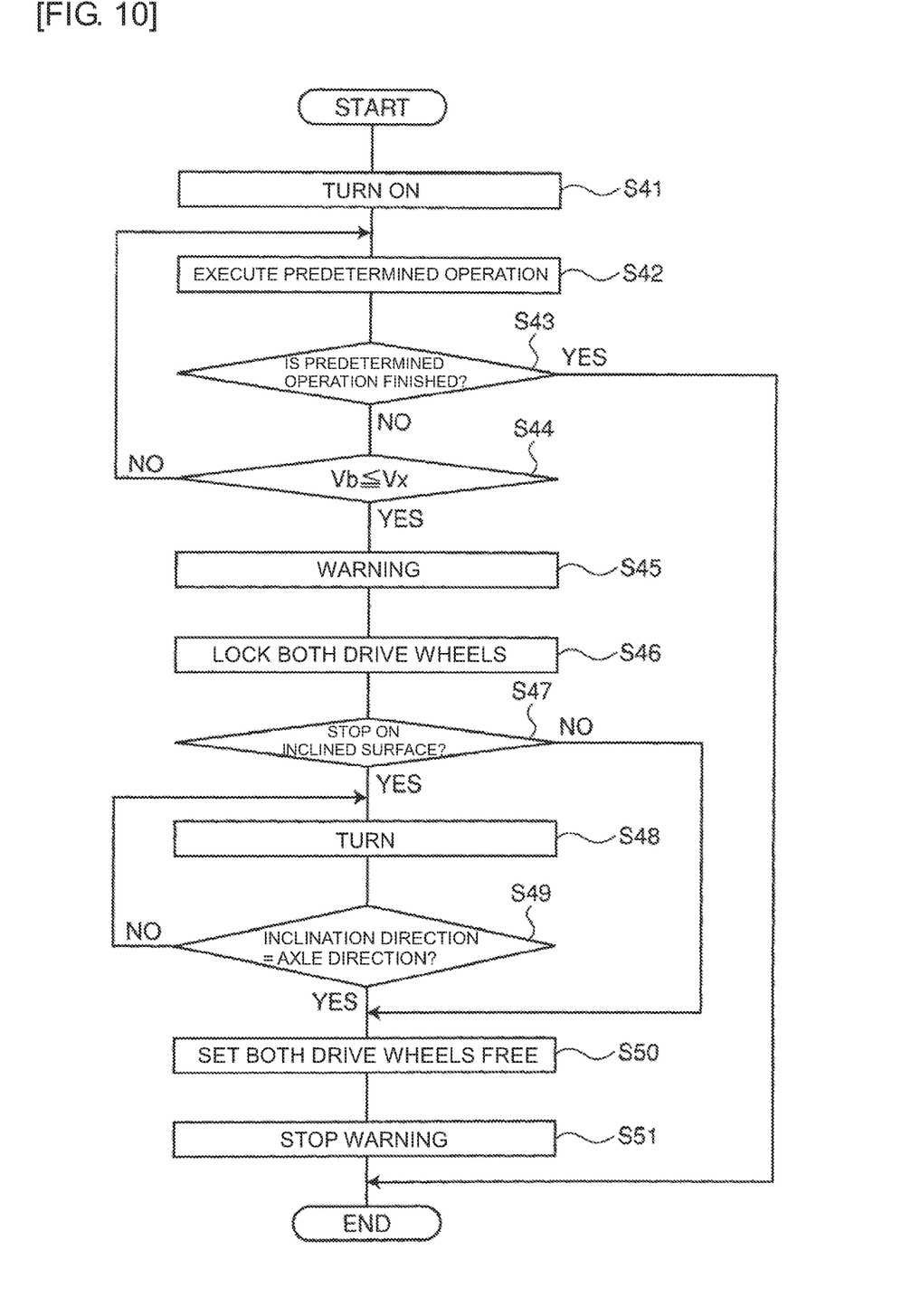
FIG. 10 is a flowchart showing an operation in a third embodiment of the present invention.

FIG. 10 is a diagram, corresponding to FIG. 6, showing an operation of the third embodiment of the present invention. The other configurations are the same as those in the first embodiment, and the description thereof will be omitted.

Hereinafter, a flow of a specific operation of a cleaner robot 1A according to the third embodiment will be described with reference to the flowchart in FIG. 10. As shown in FIG. 10, when the power supply switch 62 is turned on and the start command is inputted from the input unit 63 (step S41), the cleaner robot 1A executes a predetermined cleaning operation (step S42).

Then, it is determined whether or not the predetermined cleaning operation is finished (step S43). When it is detected that, in a state where the operation has not been finished, the terminal voltage Vb of the battery 14 drops to Vx and the battery remaining capacity Br drops to 5%, for example, as shown in FIG. 5 (step S44), a warning in the form of character information or sound information for encouraging the user to charge the battery 14 is outputted from the output unit 71 (step S45). Then, the drive wheels 5L and 5R are both temporarily locked (step S46).

When it is detected that, based on the output from the three-axis acceleration sensor 13 (FIG. 2), the cleaner robot 1A is present on the inclined surface 100 inclined in the direction of the arrow U, as shown in FIG. 7(a), in a state where the direction of the axis X passing through the rotary shafts 5Ra and 5La and the direction indicated by the arrow U are almost at right angles to each other, that is, in a state where the cleaner robot 1A falls down if the drive wheels 5L and 5R are freed from the drive control of the motor driver circuit 57 (step S47), the cleaner robot 1A turns (step S48).

When it is detected that the inclination direction indicated by the arrow U coincides with the direction of the axis X as shown in FIG. 7(b) by the three-axis acceleration sensor 13 (step S49), the drive wheels 5L and 5R are freed from the drive control of the motor driver circuit 57 (step S50).

Thus, when the cleaner robot 1A stops on the inclined surface 100 with no capacity in the battery, the cleaner robot 1A does not fall down the inclined surface 100. After the cleaner robot 1A stops, the warning outputted from the output unit 71 is stopped (step S51).

Notably, when the predetermined operation is finished in step S43, the cleaner robot 1A returns to the home position (charging stand). In addition, when the cleaner robot 1A is not present on the inclined surface in step S47, the routine proceeds to step S50.

It has been described above that the direction of the axels of the first and second drive wheels coincides with the inclination direction of the inclined surface, and it is to be noted that a state where they do not exactly coincide with each other may be included in the present invention. In the above description, to prevent the cleaner robot from falling down the inclined surface, the control for causing the direction of the axels of the first and second drive wheels to coincide with the inclination direction of the inclined surface is performed. However, the present invention includes a case where the cleaner robot stops on the inclined surface without falling down with the inclination direction being shifted by about ±5 degrees relative to the direction of the axels of the first and second drive wheels, for example.

(Summary)

The self-propelled vacuum cleaner according to the present invention comprises a housing provided with an electrically powered traveling mechanism for traveling on a floor surface, an electrically powered cleaning mechanism for cleaning while traveling on the floor surface, a battery, and a control unit for controlling and supplying electric power from the battery to the electrically powered traveling mechanism and the electrically powered cleaning mechanism, wherein the control unit controls travel of the housing stopping on an inclined surface inclined relative to a horizontal surface, so as to move the housing from a direction in which the housing attempts to travel on the inclined surface by the weight of the cleaner to a direction in which the housing does not fall down by the weight of the cleaner, and then to stop a supply of electric power to the electrically powered traveling mechanism.

The self-propelled vacuum cleaner according to the present invention may be configured as described below.

(1) The electrically powered traveling mechanism is provided with a pair of first and second drive wheels and at least one driven wheel for causing the housing to travel while supporting the housing, and first and second motors for driving the first and second drive wheels respectively, wherein axels of the first and second drive wheels are aligned on a same axis, and the direction in which the housing attempts to travel on the inclined surface by the weight of the cleaner is set to a direction perpendicular to the axels.

According to this configuration, when a capacity in the battery becomes zero and a power supply from the battery is stopped while the self-propelled vacuum cleaner performs a cleaning operation on the inclined surface, the housing is moved such that the direction of the axels coincide with the direction of inclination to prevent the housing from falling down the inclined surface by the weight of the cleaner. Accordingly, this configuration can prevent the cleaner from falling down the inclined surface to collide against furniture, scratch furniture, or give damage to the cleaner oneself.

(2) When travel of the housing is stopped on the inclined surface, the control unit temporarily locks the first drive wheel by locking the first motor that drives the first drive wheel, stops the supply of electric power from the battery to the second motor that drives the second drive wheel to set the second drive wheel free, and then, stops the supply of electric power from the battery to the first motor to set the first drive wheel free.

According to the configuration in which the control unit temporarily locks the first drive wheel, stops the power supply from the battery to the second motor that drives the second drive wheel to set the second drive wheel free, and then, sets the first drive wheel free, the cleaner can reliably be prevented from falling down the inclined surface.

(3) The first and second motors include rotary encoders for detecting whether or not the first and second drive wheels rotate, and the control unit is configured to, when travel of the housing is stopped on the inclined surface, repeat an operation for turning the housing at a small angle and an operation for stopping the supply of electric power to the first and second motors from the battery, until the drive wheels stop rotating when the supply of electric power to the first and second motors from the battery is stopped.

In addition, the housing is provided with a three-axis acceleration sensor for detecting an inclination of the housing, and the control unit is configured to, when travel of the housing is stopped on the inclined surface, turn the housing so that the direction of the axels of the first and second drive wheels and an inclination direction of the inclined surface coincide with each other, and then, to stop the supply of electric power to the first and second motors from the battery.

According to this configuration, the self-propelled vacuum cleaner can be stopped at almost the same position where the self-propelled vacuum cleaner starts to fall down the inclined surface, whereby the position where the cleaner stops can accurately be grasped.

The disclosed embodiments should be considered in all respects as illustrative and not restrictive. The scope of the present invention is presented not in the above description but in the claims set forth below. The scope of the present invention is intended to encompass all modifications within the scope and equivalents in meaning of the claims set forth below.

DESCRIPTION OF REFERENCE SIGNS

1A Cleaner robot
2 Housing
2a Bottom plate
2b1 Lid
2b Top plate
2c Side plate
3 Rotary brush
4 Side brush
4a Power-receiving terminal
4b Power-receiving terminal
5R Right drive wheel
5L Left drive wheel
7 Rear wheel
8 Front wheel
9 Ultrasonic sensor
10 Suction path
11 Suction opening
12 Floor surface detection sensor
13 Three-axis acceleration sensor
14 Battery
15 Control board
20 Dust-collecting unit
21 Dust-collecting box
22 Filter
30 Electrically powered fan
41 Exhaust opening
50 Exhaust path
62 Power supply switch
63 Input unit
71 Output unit
100 Inclined surface
U Arrow

The invention claimed is:

1. A self-propelled vacuum cleaner comprising:
a housing provided with an electrically powered traveling mechanism for traveling on a floor surface,
an electrically powered cleaning mechanism for cleaning while traveling on the floor surface,
at least a first driving wheel and a second driving wheel that cause the housing to travel while supporting the housing,
a battery that provides electric power, and
a control unit for controlling and supplying electric power from the battery to the electrically powered traveling mechanism and the electrically powered cleaning mechanism, wherein when remaining capacity of the battery is lower than a threshold and the housing is on an inclined surface inclined relative to a horizontal surface, the control unit locks the first driving wheel and stops supplying electric power from the battery to the second driving wheel, so as to move the housing from a direction in which the housing attempts to travel on the inclined surface by the weight of the cleaner to a direction in which the housing does not fall down by the weight of the cleaner, and then stops a supply of electric power to the electrically powered traveling mechanism.

2. The self-propelled vacuum cleaner according to claim 1, wherein the electrically powered traveling mechanism is provided to the first and second driving wheels and at least one driven wheel for causing the housing to travel while supporting the housing, and wherein the self-propelled vacuum cleaner further comprises first and second motors for driving the first and second die driving wheels respectively, wherein axles of the first and second driving wheels are aligned on a same axis, and the direction in which the housing attempts to travel on the inclined surface by the weight of the cleaner is a direction perpendicular to the axles.

3. The self-propelled vacuum cleaner according to claim 2, wherein the control unit temporarily locks the first driving wheel by locking the first motor that drives the first driving wheel, then stops the supply of electric power from the battery to the second motor that drives the second driving wheel to set the second driving wheel free, and finally stops the supply of electric power from the battery to the first motor to set the first driving wheel free.

4. The self-propelled vacuum cleaner according to claim 2, wherein the first and second motors include rotary encoders for detecting whether or not the first and second driving wheels rotate, and wherein the control unit is further configured to, when travel of the housing is stopped on the inclined surface, repeat an operation for turning the housing at a small angle and an operation for stopping the supply of electric power to the first and second motors from the battery, until the first and second driving wheels stop rotating when the supply of electric power to the first and second motors from the battery is stopped.

5. The self-propelled vacuum cleaner according to claim 2, wherein the housing is provided with a three-axis acceleration sensor for detecting an inclination of the housing, and wherein the control unit is further configured to, when travel of the housing is stopped on the inclined surface, turn the housing so that the direction of the axles of the first and second drive wheels and an inclination direction of the inclined surface coincide with each other, and then, to stop the supply of electric power to the first and second motors from the battery.

* * * * *